United States Patent [19]

Schlaikjer

[11] 4,020,240
[45] Apr. 26, 1977

[54] ELECTROCHEMICAL CELL WITH CLOVOBORATE SALT IN ELECTROLYTE AND METHOD OF OPERATION AND COMPOSITION OF MATTER

[75] Inventor: Carl R. Schlaikjer, Arlington, Mass.

[73] Assignee: P. R. Mallory & Co., Inc., Indianapolis, Ind.

[22] Filed: Sept. 3, 1975

[21] Appl. No.: 610,518

[52] U.S. Cl. .............................. 429/50; 252/62.2; 423/197; 429/196; 429/199; 429/200
[51] Int. Cl.² ........................................ H01M 6/14
[58] Field of Search .................... 136/155, 6 LN, ; 252/62.2; 429/50, 196, 199, 200

[56] References Cited

UNITED STATES PATENTS

| | | | |
|---|---|---|---|
| 3,578,500 | 5/1971 | Maricle | 136/6 LN |
| 3,897,264 | 7/1975 | Auborn | 136/155 |
| 3,923,543 | 12/1975 | Auborn et al. | 136/155 |

Primary Examiner—Donald L. Walton
Attorney, Agent, or Firm—Ronald S. Cornell; Israel Nissenbaum; Charles W. Hoffmann

[57] ABSTRACT

An electrolyte salt containing a clovoborate anion structure when employed in an electrochemical cell comprising an active metal anode and an electrolyte solvent/cathode depolarizer has the characteristics of high potential and current capabilities at low temperatures and resists anode passivation during long time storage even at elevated temperatures.

26 Claims, 6 Drawing Figures

ELECTROCHEMICAL CELL WITH CLOVOBORATE SALT IN ELECTROLYTE AND METHOD OF OPERATION AND COMPOSITION OF MATTER

FIELD OF THE INVENTION

This invention pertains to electrolytes employed in non-aqueous electrolytic cells and more particularly to cells utilizing a soluble cathode system in which a fluid oxyhalide or non-metallic oxide or non-metallic halide or mixtures thereof is or are both the electrolyte solvent and the primary active cathode substance.

BACKGROUND OF THE INVENTION

Electrochemical cells for use as power sources, particularly in conjunction with hearing aids and other medical related devices, are known which employ soluble or liquid cathodes as opposed to the more conventional solid cathode cells. In such soluble cathode cells the active cathode material is usually the electrolyte solvent, or one of the co-solvents. During discharge, the solvent or co-solvents are electrochemically reduced on a current collector such as a screen, having applied thereto a mixture of an inert and electrically conductive material such as carbon black, graphite, or other electrical conductors of high surface area, and, preferably, including absorbing and binding agents. The anode for these cells is preferably lithium metal although other active metals above hydrogen in the activity scale or electromotive series including sodium, potassium, rubidium, calcium, magnesium, strontium, barium and cesium may be used either singly or in combination.

Soluble cathode cells based upon the utilization of lithium as the anode active metal and thionyl chloride ($SOCl_2$) as both electrolyte solvent and soluble cathode and lithium aluminum chloride ($LiAlCl_4$) as the electrolyte salt have been prepared with roughly the dimension of conventional "D" and "C" size cells, using a convolutely wound structure. "C" cells were observed to realize about 156 watt-hours per pound, about 11.6 watt-hours per cubic inch and up to about 93 watts per pound at about 3 volts potential per cell for freshly prepared cells. These high potentials and capacities make this type of cell particularly useful in devices requiring infrequent replacement of cells such as in heart pacemaker devices. However, several problems exist with this cell which presently militate against its widespread practical use.

One deficiency of the cells described above, using $LiAlCl_4$ as the electrolyte salt, is that filled or activated cells which have been stored, particularly at elevated temperatures for extended periods of time, will exhibit an undesirable initiation period or delay time when discharge is attempted. This initiation, or delay time is due to passivation of the lithium anode, that is, formation of an electrically insulating film or layer over the lithium and its severity is dependent upon the conditions of storage. It has been observed that storage at about 72° C for about 4 days is sufficient to passivate the lithium anode to the extent that reverse polarization of the cell for several minutes may be necessary to sufficiently remove the insulating film or layer and reactivate the anode.

THE INVENTION

It is a feature of the present invention to provide an electrolyte salt as a method for ion transport including a cation of a metal and a clovoborate anion (for nomenclature, see R. Adams, Inorg. Chem. 2, 1087, (1963)). Another feature of the present invention is that the electrolyte salt is sufficiently soluble and stable in a fluid oxyhalide or non-metallic oxide or non-metallic halide and mixtures thereof to function in an electrochemical cell. Yet another feature of the present invention is that the electrolyte salt, when used in electrochemical cells, helps reduce capacity losses at low operating temperatures, helps reduce passivation of the metal anode, and thus helps reduce the voltage delay associated with start-up after storage at elevated temperatures. It is a further feature of the present invention to provide an electrochemical cell having as electrolyte salt a compound having (a) a cation of a metal and (b) a clovoborate anion with the formula $(B_mX_n)^{-k}$, where $m$, $n$ and $k$ are integers, B is boron, and X is selected from the group consisting of H, F, Cl, Br, I & OH wherein at least some of the substituents are halides and combinations thereof. The metal clovoborate can be used in combination with an electrolyte solvent selected from a fluid oxyhalide or non-metallic oxide or non-metallic halide or mixtures thereof. Another feature of the invention is a composition of matter including a cation of a metal and a clovoborate anion as an electrolyte salt and a material selected from a fluid oxyhalide or non-metallic oxide or non-metallic halide or mixtures thereof. These and various other features of the invention as well as many specific advantages will be more fully apparent from a detailed consideration of the remainder of this disclosure and the drawings.

DETAILED DESCRIPTION OF THE INVENTION

Figure 6:
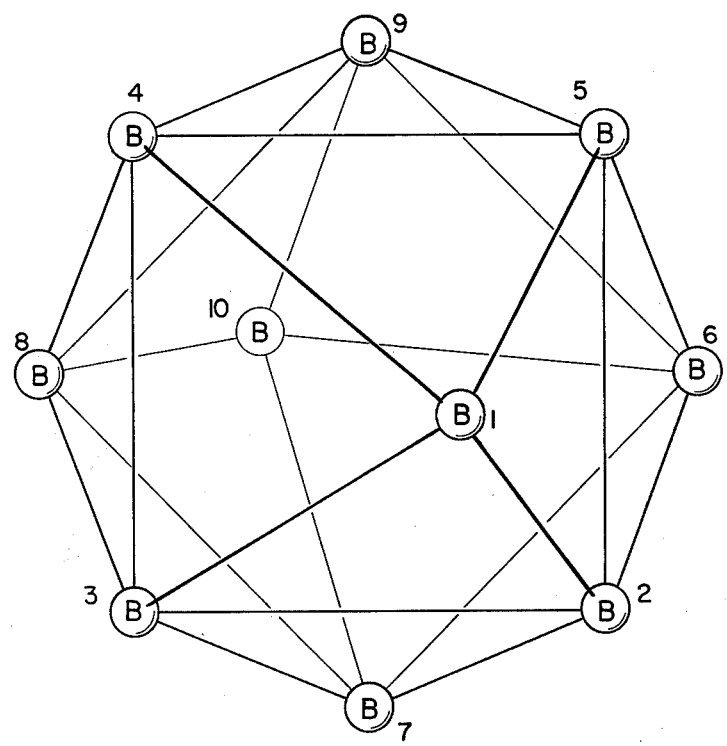
FIG. 6 is a schematic drawing of a clovoborate structure.

Generally speaking, the present invention relates to an electrolyte salt containing a clovoborate anion whose closed caged structure is illustrated in FIG. 6 and a metal as the cation. The metal of the cation is selected from the metals Li, Na, K, Rb, Cs, Mg, Ca, Sr and Ba in Groups IA and IIA of the Periodic Table. This metal usually though not necessarily is the same as the metal of the anode of the electrical system in which the electrolyte is a component. Therefore in high energy density cells currently available the preferred metals would include lithium (Li), sodium (Na), potassium (K), magnesium (Mg), and calcium (Ca). The colvoborate anion has the general formula $(B_mX_n)^{-k}$ where B is the element boron and $m$, $n$ and $k$ are integers and X can be selected from a wide range of elements and groups of elements which may also include organic groups alone or in combination. This wide range of possibilities may be attributed essentially to the structure of the clovoborate anion which because of its caged structure is stable and resistant to degradation. The substituent groups on the caged boron structure may control, to some extent, the usefulness of the salt as an electrolyte salt. As examples of several clovoborate salts useful in electrochemical cells and the like, X in the above formula is preferably selected from the halogens (F, Cl, Br and I) but can also be H or OH preferably in combination with halogen or halogens. The halogenated form of the clovoborate anion appears to provide more advantageous results than the hydride form because where X is hydrogen rather than a halogen, the B-X bond appears less stable, but all nevertheless embody the concepts of the invention. With the halogen and hydrogen forms of the clovoborate anion just mentioned, the preferable forms would be those in which $m$ and $n$ of the above formula are integers selected from the group of 6-20 for M and 6-18 for $n$. Most preferably $m$ and $n$ are both 6, 9, 10, 11 or 12. Generally both $m$ and $n$ are the same, but in some cases they may differ because of cage linkups. The integer $k$ may range from 1-4 but preferably is 2. As a single embodiment a presently preferred composition is where X is chlorine and $m$ and $n$ are both 10. This composition is quite useful as an electrolyte salt in electrochemical cells. In particular, the composition is especially useful when used as an electrolyte salt in an electrochemical cell containing a metal anode such as lithium and an electrolyte solvent cathode depolarizer material such as thionyl chloride. When the composition is used in an electrochemical cell, it is presently preferred that the metal of the cation be the same as the active metal of the anode in order to help prevent, among other things, the formation of extraneous salts upon electrical discharge. Thus, for example, when a lithium anode is used, it is preferred that the composition used as the electrolyte salt includes a cation of lithium.

Use of an electrolyte salt embodying the concepts of the invention in an electrochemical cell having a lithium anode and thionyl chloride electrolyte solvent/soluble cathode depolarizer provides a cell capable of operating under heavy load conditions at low temperatures with minimal start-up delay even after extended periods of storage at elevated temperatures.

The preferred concentration of electrolyte salt in a thionyl chloride electrolyte solvent/cathode depolarizer is such that the conductivity lies within a useful range. A preferred embodiment would be a percentage ranging between about 10 wt. % to about 25 wt. % of the total weight of the electrolyte salt and cathode depolarizer combination. The presently most preferred concentration is about 12 wt. % electrolyte salt. At 20° C, the conductivity of pure $SOCl_2$ is $3.5 \times 10^{-9}$ $ohm^{-1}$ $cm^{-1}$. Thus the ratio of $SOCl_2$ to the electrolyte salt would be such that the conductivity of the preferred electrolyte solution would thus be in the range of $4.0 \times 10^{-9}$ to $1.0 \times 10^{-1}$ $ohm^{-1}$ $cm^{-1}$ at 20° C.

In thionyl type cells with lithium anodes, specific presently preferred salts known and characterized in the chemical literature include $Li_2B_{10}Cl_{10}$, $Li_2B_{10}Br_{10}$, $Li_2B_{10}I_{10}$, $Li_2B_{12}Cl_{12}$, $Li_2B_{12}Br_{12}$, $Li_2B_{12}I_{12}$, $Li_2B_6Br_6$, and $Li_2B_{12}Br_8F_4$. Less preferred salts include $Li_2B_9Cl_8H$, $Li_2B_9Br_6H_3$, $Li_2B_{11}Br_9H_2$, $Li_2B_{12}H_8F_4$, $Li_2B_{12}H_7F_5$, and $Li_2B_{12}H_6F_6$ and $Li_2B_{12}F_{11}OH$.

The electrolyte salts of the present invention are also useful in electrochemical cells utilizing a solvent selected from a fluid oxyhalide, or non-metallic oxide or non-metallic halide and mixtures thereof such as phosphorous oxychloride ($POCl_3$), selenium oxychloride ($SeOCl_2$), sulfur dioxide ($SO_2$), sulfur trioxide ($SO_3$), vanadium oxytrichloride $VOCl_3$, chromyl chloride ($CrO_2Cl_2$), sulfuric oxychloride ($SO_2Cl_2$), Nitryl chloride 2Cl), nitrosyl chloride (NOCl), nitrogen dioxide ($NO_2$), sulfur monochloride ($S_2Cl_2$) and sulfur monobromide ($S_2Br_2$). Each of the above can be used together with thionyl chloride ($SOCl_2$) as electrolyte solvent/cathode depolarizer or separately. Cosolvents or solvents other than $SOCl_2$ may also be electrochemically reduced on the cathode, but this reduction will not occur at the same potential as that for $SOCl_2$. Cosolvents will thus alter the energy density of such cells, either lowering it or raising it depending upon the solvent or cosolvent chosen. However, co-solvents may be necessary or useful in improving high and low temperature characteristics of the cell or in modifying properties of the system.

Fluid oxyhalides such as phosphorous oxychloride ($POCl_3$), fluid non-metallic oxides of fluid non-metallic halides or mixtures thereof may entirely replace thionyl chloride, $SOCl_2$, for the purposes of the present invention even though the discharge voltage may be generally lower.

Halogenated clovoborate anion and, in particular, the anion having the formula $B_{10}Cl_{10}^{--}$ are generally prepared by the halogenation of the hydride form of the corresponding anion having the general formula $(B_nH_n)^=$. The preparation of the clovoborate anion $B_{10}H_{10}^=$ has been discussed by Hawthorne and Muetterties and their co-workers in a series of articles appearing in J. Am. Chem. Soc. 81, 5519 (1959); 84, 1056 (1962); 84, 1057 (1962). The formation of $B_{12}H_{12}^=$ was reported and discussed by Ellis, Gaines and Schaeffer (J. Am. Chem. Soc. 85, 3885 (1963), by Miller, Miller, and Muetterties (idem.) and by Adams, Siedle, and Grant (Inorg. Chem. 3, 461 (1964). $B_{10}H_{10}^=$ and $B_{12}H_{12}^=$ is disclosed by Muetterties and co-workers in Inorg. Chem. 3, 159 (1964). Examples of the halogenated anions include $(B_{12}X_{12})^=$, $(B_{10}X_{10})^=$, and $(B_6Br_6)^=$ (observation by W. R. Hertler in article by Klanberg, Muetterties, Inorg. Chem. 5, 1955 (1966)) where X is a halogen i.e. fluorine, chlorine, bromine or iodine. The anions having $n = 6, 10, 12$ are more resistant to degradation as a result of more stable bonding and thus are preferred for purposes of the present invention.

The subject matter of all of the articles and references set forth herein is incorporated into the disclosure by reference thereto.

FIG. 6 shows the caged structure of the stable $B_{10}$ clovoborate anion with the boron atoms depicted and numbered. The caged structure remains substantially the same with other constituents including halogens replacing some or all of the original hydrogens.

The cells utilizing the novel electrolyte according to this invention are constructed with cathode current collectors of acetylene black with a Teflon binder applied to a nickel screen. Teflon is a trademark registered by E. I. du Pont De Nemours Company, Wilmington, Delaware, U.S.A. After treating the screen to insure proper adherence of the acetylene black, the cells are assembled. Typical cells can be constructed in the "C" and "D" configurations using flat lithium metal anodes and separators of borosilicate glass fibers. The cathode current collectors for cell of the "C" configuration should preferably measure about 8½ inches × 1½ inches and each contain from 1 to 1.6 grams of acetylene black applied to the nickel screen. The anode, separator, and cathode current collector strip assembly are then convolutely wound for insertion into a container for the cell.

Because of the various properties discovered in cells using the novel electrolyte of this invention several test cells are used to determine more precisely those properties. Thus, test cells of standard D size are utilized in testing the low temperature capabilities of the cells after extended high temperature storage while cells of the standard C size are used in ambient temperature start-up characteristics determinations. Both sizes are constructed as above with the C size cells having Teflon cases and rubber seals and the D cells having metal cases and glass seals. Cell size, does not however affect cell performance except for total capacity.

The invention will be more fully described by the following examples, wherein EXAMPLE 1 describes the preparation of $Li_2B_{10}Cl_{10}$ as an example of the halogenated salts of this invention. EXAMPLE 2 describes the preparation and handling of an electrolyte containing the $Li_2B_{10}Cl_{10}$ dissolved in thionyl chloride for utilization in electrochemical energy generating cells. EXAMPLE 2 additionally shows the stable nature of the salt when dissolved in the thionyl chloride. It is postulated that the salt is substantially soluble and ionically dissociates in the thionyl chloride through formation of a complex between the anion and the $SOCl_2$. The anion is the active principle of this invention, and is also believed to be the agent which helps prevent the passivation of the lithium anode.

EXAMPLE 3 describes the preparation of the C size cells according to this invention (the D size cells are prepared in basically the same manner) and the initial discharge characteristics of the C cells. EXAMPLE 3 demonstrates that the electrolyte of the present invention when added to the aforementioned cell functions both as a useful electrolyte and as a soluble cathode or depolarizer. EXAMPLE 4 demonstrates the low temperature characteristics of the D cell using the novel electrolyte of this invention as compared to the performance of prior art cells.

EXAMPLE 5 demonstrates, in tabular form, the discharge characteristics of the cells according to this invention and those of the prior art after prolonged periods of storage at 72° C. EXAMPLE 5 demonstrates that the start-up delay for cells according to the present invention is shorter and less severe than cells using $LiAlCl_4$ as the dissolved conductive species for the electrolyte.

It is understood that the attached examples are merely exemplary and that all art recognized equivalents of the materials may be utilized and that such interchangeable utilization of equivalents is intended to be within the scope of this invention.

It may be further noted, that the invention may be practiced with other metal anodes. In such circumstances, the specific active metal salts of such active metals with the halogenated clovoborate anions preferably may be substituted, but the lithium salts may also be used.

EXAMPLE 1

The preparation of novel electrolytically conductive lithium halogenated clovoborate salts is exemplified by the preparation of $Li_2B_{10}Cl_{10}$:

The anion $B_{10}Cl_{10}^=$ is prepared starting with decaborane, $B_{10}H_{14}$. About 5 grams of $B_{10}H_{14}$ (41 millimoles) are dissolved in about 30 ml. of anhydrous benzene in a 200 ml round bottom flask. In a separate vessel about 14.5 ml of distilled triethylamine (104 mm) and about 35 ml of anhydrous benzene are mixed. The mixture is then added slowly to the flask containing the solution of decaborane and the total mixture is refluxed for about 16 to about 24 hours. After this time, a white solid separated whose composition is $(NEt_3H)_2B_{10}H_{10}$, i.e. the bistriethylammonium salt of the anion $B_{10}H_{10}^=$. The procedure to this point is described by M.F. Hawthorne and A. R. Pitochelli (J. Am. Chem. Soc. 81, 5519, (1959)).

The $B_{10}H_{10}^=$ anion is then chlorinated in aqueous solution and the $B_{10}H_{10}^=$ is transformed to $B_{10}Cl_{10}^=$ by the following procedure which differs from the one described by Muetteries et al (Inorganic Chem. 3, 159, (1964)) in that higher concentrations in the order of $2.5 \times 10^{-1}$ M and the sodium salt are used in place of the ammonium salt and lower concentrations in the reference in the order of $4.3 \times 10^{-4}$ M.

About 6.45 grams (40 mm) of $(NEt_3H)_2B_{10}H_{10}$ are dissolved in a solution of about 3.52 grams of NaOH (88 mm, a 10% excess) in about 60 ml of water. The released triethylamine is removed first by using a separatory funnel, then by using the funnel and washing the solution with several 30 ml portions of benzene. The remaining solution is then adjusted to about pH 5 using acetic acid, and diluted to about 160 ml with water. Chlorine gas is then slowly introduced into the agitated solution. After about 12 to 15 hours, excess chlorine is removed by boiling from the resultant deep green solution. An aqueous solution of about 12.3 ml of triethylamine (88 mm) in a slight excess of 6 M hydrochloric acid is then added to the reaction vessel. The slightly soluble salt $(NEt_3H)_2B_{10}Cl_{10}$ is precipitated and is then filtered and washed to remove sodium chloride, sodium acetate, hydrochloric acid and water.

The lithium salt is then prepared and purified by the following method:

About 2.11 grams of lithium hydroxide (88 mm) are dissolved in 50 ml of water. About 26.7 grams (40 mm) of $(NEt_3H)_2B_{10}Cl_{10}$ are then introduced and dissolved. The released triethylamine is extracted with about three 50 ml portions of benzene. The aqueous solution is then acidified with concentrated hydrochloric acid while agitating. The remaining amine precipitates and is filtered to substantially remove it from the solution. The solution is then made basic again with a slight excess of solid LiOH. About 4.2 grams (100 mm) of lithium chloride are then dissolved in the basic solution and the solution is mixed with about 50 ml of tetrahydrofuran in a separatory funnel. The lighter phase then contains essentially all of the desired product, along with some water and lithium chloride. This phase is mixed with one gram of solid lithium chloride. The salt removes most of the water from the ethereal solution, forming a heavier aqueous phase which is removed. The process is repeated until solid lithium chloride remains after mixing and standing. The lighter phase after separation from all solids and droplets of aqueous phase is then transferred to a 100 ml flask which includes a small fractionating column leaving an azeotropic mixture of THF and water with the dissolved desired product. Fractional distillation of the mixture results in the removal of the wet azeotrope of the THF and water at a temperature of 64° C, rendering the solution gradually drier. Crystals of the product form as the liquid distilled from the flask is replaced with dry tetrahydrofuran. These are filtered and washed with dry tetrahydrofuran, then dried at about 160° C (available oven temperature) for about 48 hours. The resulting $Li_2B_{10}Cl_{10}$ crystals are checked for purity by infrared spectroscopy.

EXAMPLE 2

The preparation of electrolyte including thionyl chloride soluble cathode material:

A solution is prepared by dissolving about 3 grams of $Li_2B_{10}Cl_{10}$ in about 12 ml distilled thionyl chloride, refluxing in a glass vessel with strips of freshly cut lithium for about 2 hours, then adding distilled thionyl chloride to a total volume of about 25 ml. The resulting mixture is deep violet in color and contains no precipitate. The bistriethylammonium salts of substituted clovoborate anions are only slightly soluble in water and may be easily recovered by precipitation. a sample of this amine salt is prepared in water from the original $Li_2B_{10}Cl_{10}$ and another from a hydrolized aliquot of the solution $Li_2B_{10}Cl_{10}$ in thionyl chloride. The two samples produced substantially identical infrared spectra, demonstrating that no harmful substitution or alternation of the anion occurs during reflux in $SOCl_2$ with lithium metal present. After hydrolysis, the solution of $Li_2B_{10}Cl_{10}$ in water was colorless, suggesting that the color is produced by a complex formation between the anion and $SOCl_2$.

EXAMPLE 3

Figure 1:
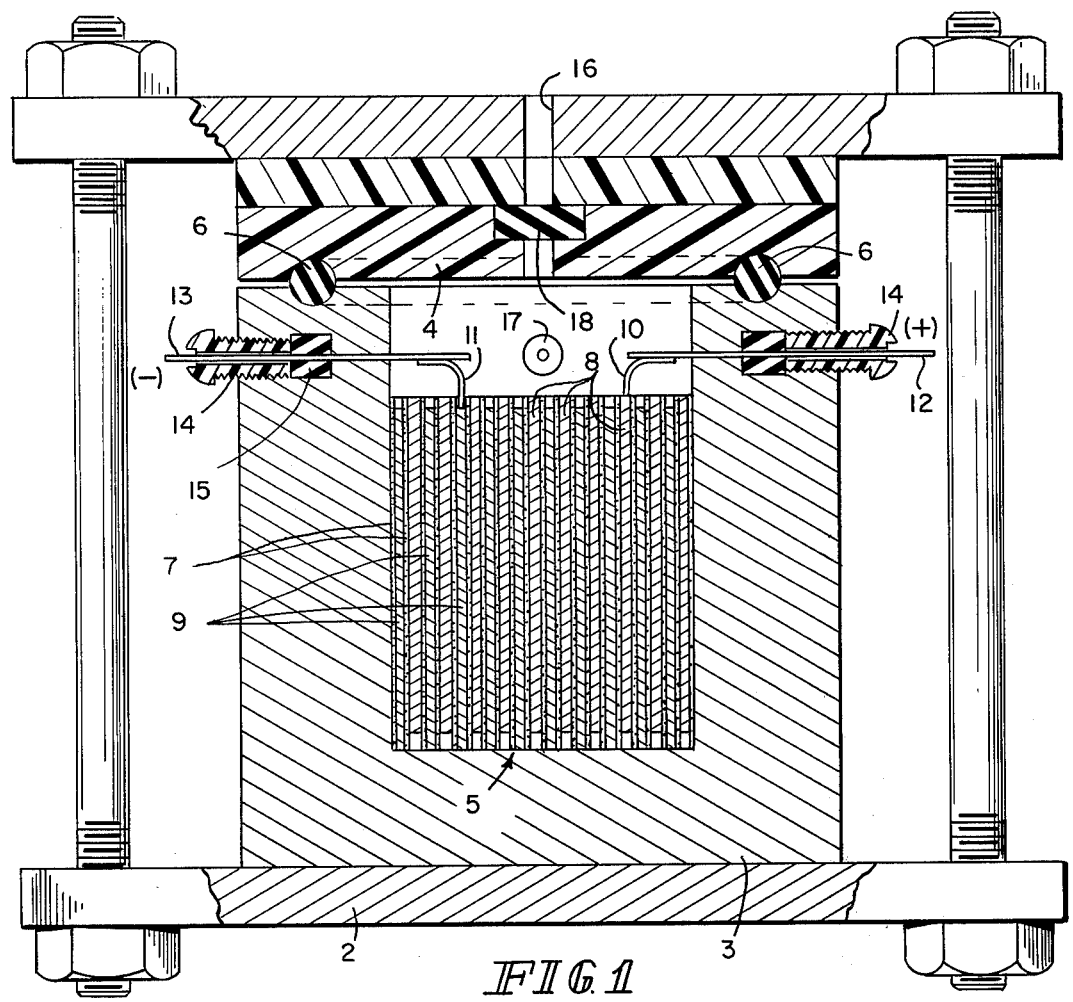
FIG. 1 is a test cell structure including a lithium anode, thionyl chloride electrolyte solvent/cathode depolarizer and clovoborate electrolyte salt system.

FIG. 1 is a cross sectional view of the electrochemical test cell assembly used for testing the electrochemical generator of this invention. The test cells having C and D cell size configuration are substantially alike with the C cells being described as follows and the D cells differing by having metal cases and glass seals instead of the Teflon casing and rubber seals used in the C size test cell:

The assembly as shown in FIG. 1 consists of an aluminum cell holder 2 holding the cell elements consisting of Teflon cell body 3 and Teflon cover 4 enclosing and sealing via O-ring 6 of neoprene and helically wound electrode stack 5. The electrode stack 5 consists of cathode collector sheet 8 of nickel expanded metal mesh and lithium ribbon 9 separated from each other by separator mats 7. The electrode stack is convolutely wound. The dimensions are selected so that the wound stack assembly 5 has the approximate dimensions of a commercial C cell, i.e. 0.90 inches in diameter and 1.75 inches in height.

As the electrolyte and the anode are air-sensitive the cell and its elements are sealed from the external environment by the o-ring 6 and electrode septums 15 for cathode terminal 12 and anode terminal 13 respectively which reach the exterior of the cell through the insulating screws 14. The terminals are connected via cathode lead 10 and anode lead 11 respectively to the cathode and anode elements 8 and 9.

The electrolyte is introduced into the cell via electrolyte fill port 16 through the self-sealing neoprene septum 18 and about 25 ml of the electrolyte are used to fill the cell.

The test cell is provided with a lithium reference electrode 17, similar to the feed throughs 14, to monitor electrode polarization. The anode 9 in the test cell contains about 6 ampere hours of lithium.

The open circuit potential of the $Li/SOCl_2$ cells of both the prior art and this invention is about 3.62 ± 0.05 volts.

Figure 2:
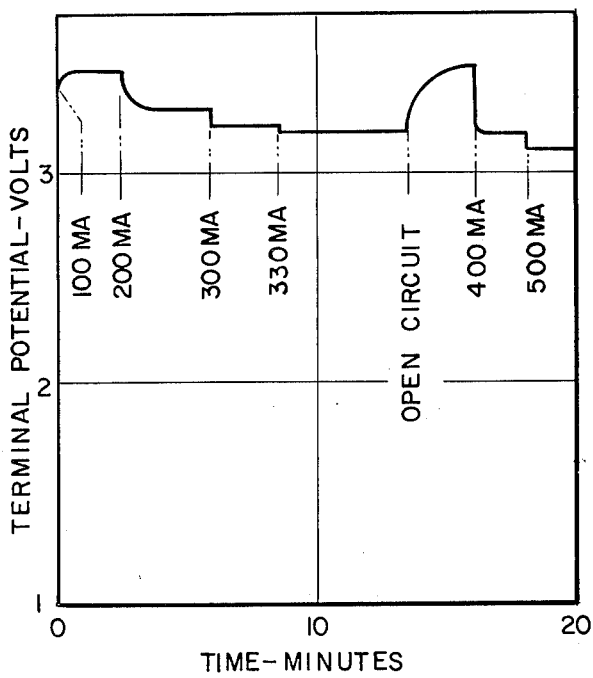
FIGS. 2 and 3 show polarization data for the clovoborate electrolyte salt C size cells having different separators shortly after filling, on discharge at room temperature.
Figure 3:
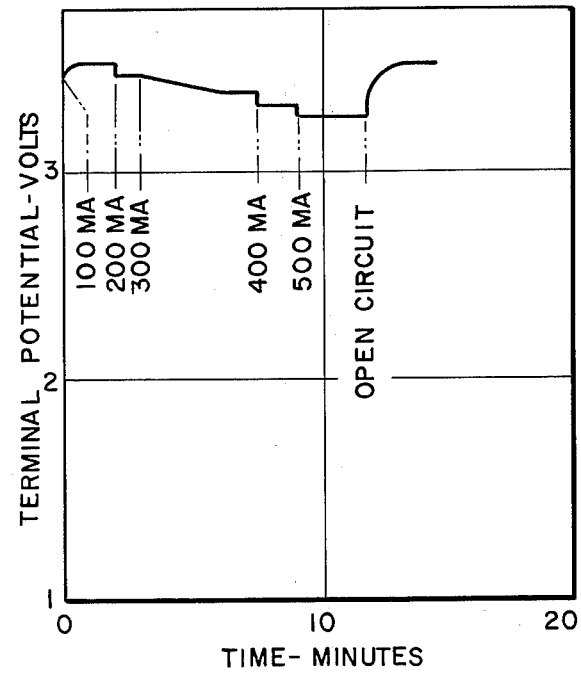

When the electrolyte according to EXAMPLE 2 is introduced into the above described cell having glass fiber separators between the anode 9 and the cathode collector 8 such cells show the polarization potentials under loads as in FIG. 2. When polypropylene separators are substituted for the glass fiber separators such cells exhibit the polarization potentials at the different loads as shown in FIG. 3.

EXAMPLE 4

Low temperature characteristics of cells using the novel electrolyte of this invention as compared to prior art cells:

All of the cells used were of standard D size and stored for either 1 month of 4 weeks at 72° C. The cells were cooled to −30° C for 2 hours prior to discharge.

Figure 4:
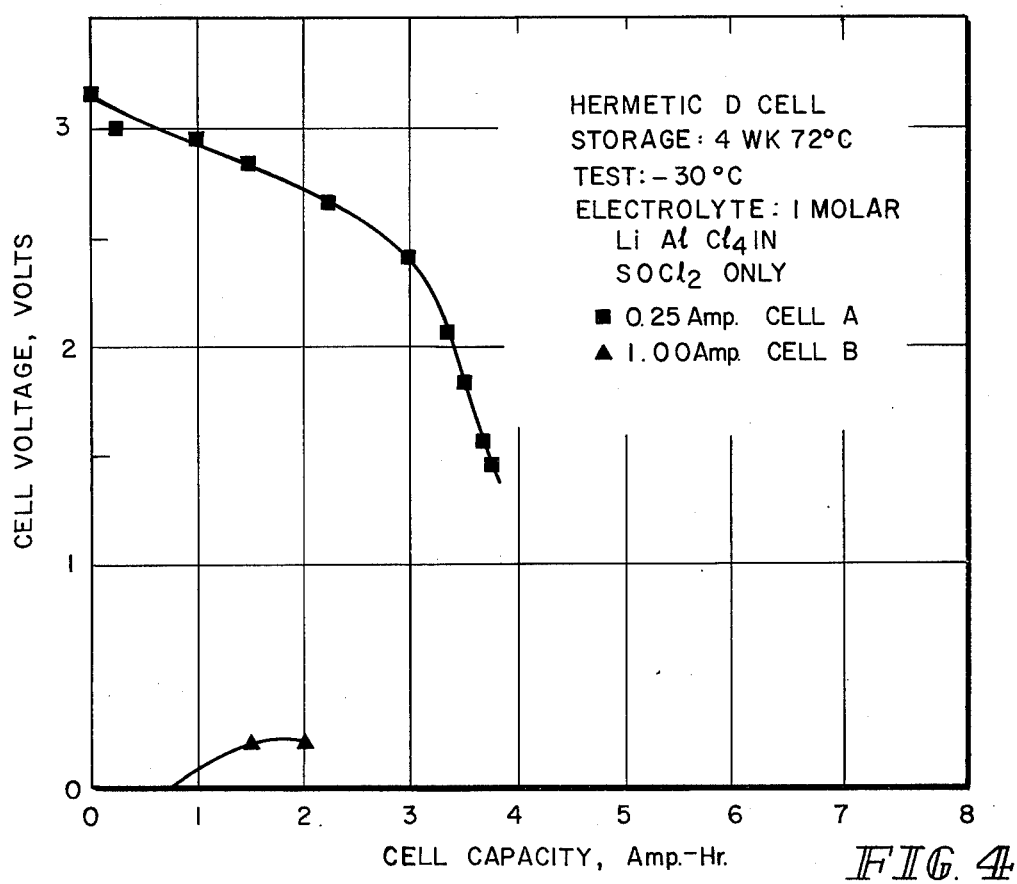
FIG. 4 is a discharge curve of prior art cells using $LiAlCl_4$ as the electrolyte salt under low temperature conditions after high temperature storage.

Prior art cells using $LiAlCl_4$ as the electrolyte performed as depicted in FIG. 4 at various constant current loads. The electrolyte consists of about 1 Molar $LiAlCl_4$ in $SOCl_2$ as the only solvent.

The discharge curve of cell A is taken under a load of about 0.25 amperes.

The discharge curve of cell B is taken under a load of about 1.00 amperes.

As shown in FIG. 4, cell B required about 0.8 amphours, or about 0.8 hours, or 48 minutes before its terminal potential recovered above zero volts. Cell A delayed to about 2.4 volts for several seconds and this delay is not shown in FIG. 4.

In comparison substantially identical cells using the novel electrolyte with 0.4333 N $Li_2B_{10}Cl_{10}$ in $SOCl_2$ only, are discharged after storage at about 72° C for 1 month.

Figure 5:
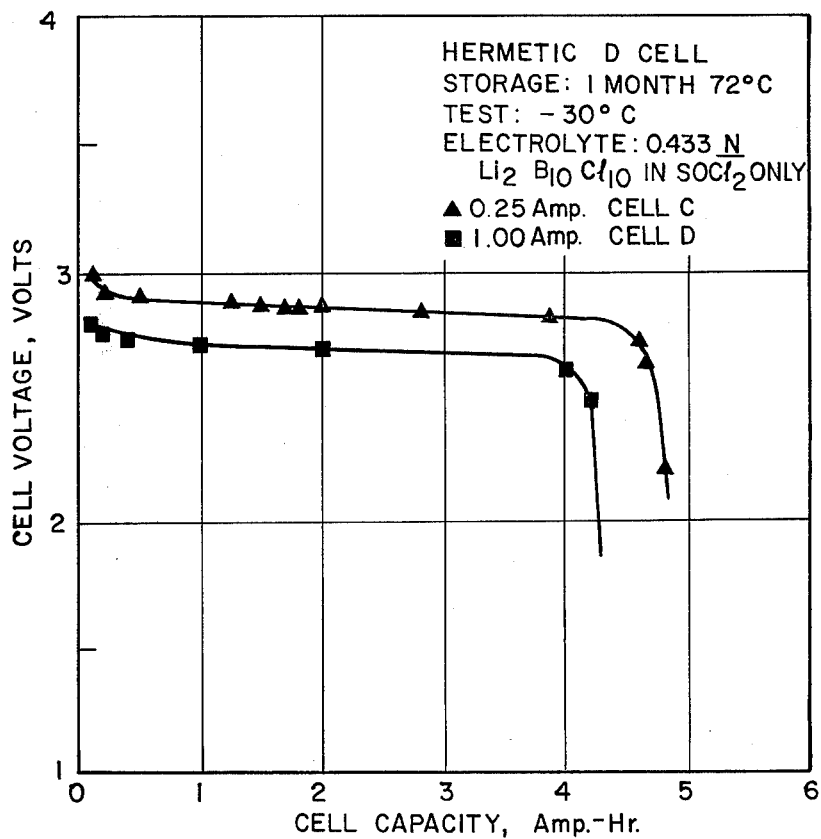
FIG. 5 is a discharge curve of cells using the clovoborate electrolyte salt of the invention under the same conditions as the prior art cells shown in FIG. 4.

Cell D which discharges at a rate of 1 ampere delayed to about 2.6 volts, but recovered to about 3.3 volts in less than 1 second. Cell C which discharges at a rate of about 0.25 amp did not drop below 3 volts on startup. FIG. 5 shows the above-mentioned cells with the novel clovoborate electrolyte during the rest of their discharge. The discharge curve of cell C shows that this cell which runs at about 0.25 amp realizes about 4.8 amp hours before the output drops to 2 volts. This cell has a running potential above 2.75 volts. In contrast the prior art cell A discharged at this rate realizes only 3.5 amp hours to about 2 volts and has a less desirable sloping discharge curve (FIG. 4). The cell containing $Li_2B_{10}Cl_{10}$ functions well at 1 amp in marked contrast to the functioning of cell B which uses $LiAlCl_4$ (FIG. 4).

EXAMPLE 5

Room temperature discharge characteristics after about 72° C storage as compared to prior art cells:

Test cells are constructed in the size C configuration for both the prior art material containing about 1.5 M $LiAlCl_4$ in $SOCl_2$ only, as the electrolyte and electrolyte solvent respectively, and the cells utilizing the novel electrolyte of this invention in the concentration of about 0.50 N $Li_2B_{10}Cl_{10}$ in $SOCl_2$ only. All the cells are discharged at about 0.50 amp constant current at room temperature following storage.

The following tables illustrate advantages of cells utilizing the novel electrolyte of this invention particularly when compared to cells utilizing the electrolyte, $LiAlCl_4$, of the prior art. Table I shows the recovery time when discharged at ambient temperature for prior art cells when stored at about 72° C for varying lengths of time without any discharge before storage.

Table II shows the prior art cells' recovery time after being discharged at about 0.5 amp constant current for an hour prior to storage at about 72° C.

Table III shows the recovery time for cells using the novel electrolyte containing the clovoborate anion of this invention after discharge for a short period of time shown in FIG. 2 & 3 prior to storage which discharge was performed to obtain the polarization curve of FIGS. 2 & 3.

*TABLE I

| CELL | LiAlCl₄ -electrolyte salt in SOCl₂ | | |
|---|---|---|---|
| | STORAGE TIME | STORAGE TEMPERATURE | TIME TO RECOVER TO 2 VOLTS |
| 1 | 4 DAYS | 72° C | 15 SECONDS |
| 2 | 4 DAYS | 72° C | 200 SECONDS |
| 3 | 5 DAYS | 72° C | 40 SECONDS |
| 4 | 6 DAYS | 72° C | 300 SECONDS |

*TABLE II

| CELL | LiAlCl₄ -electrolyte salt in SOCl₂ with storage after 1 hour of discharge | | | |
|---|---|---|---|---|
| | STORAGE TIME | STORAGE TEMPERATURE | TIME TO RECOVER 2 VOLTS | RECOVERY TIME TO THREE VOLTS |
| 5 | 3 DAYS | 72° C | 70 SECONDS | 295 SECONDS |
| 6 | 4 DAYS | 72° C | 25 SECONDS | — |
| 7 | 6 DAYS | 72° C | 50 SECONDS | — |

*TABLE III

| CELL | Li₂B₁₀Cl₁₀ -electrolyte salt in SOCl₂ with storage after short discharge time | | | |
|---|---|---|---|---|
| | STORAGE TIME | STORAGE TEMPERATURE | TIME TO RECOVER 2 VOLTS | RECOVERY TIME TO THREE VOLTS |
| 8 | 11 DAYS | 72° C | 0 | 280 SECONDS |
| 9 | 4 DAYS | 72° C | 0 | 1 SECOND |

*Discharge for tables I, II and III was at ambient temperature and 0.5 amps constant current.

From a comparison between Tables I and II it is evident that discharge prior to storage will improve the time needed for recovery of those cells to 2 volts. However, a comparison between Tables II and III shows that though both are discharged prior to storage the recovery capabilities of the cells using the novel electrolyte of this invention are far greater than those of the prior art. In fact, the only cell with $LiAlCl_4$ which recovered past 3 volts was cell 5, stored the least amount of time. Cell 5 still required 295 seconds to recover, while cell 9 with $Li_2B_{10}Cl_{10}$ although stored one day longer required only about 1 second to recover past three volts.

Thus, it is clear that after storage at elevated temperatures electrolyte salts containing clovoborate anions with $SOCl_2$ as the electrolyte solvent and soluble cathode produce substantially less start-up delay than comparable cells using a $LiAlCl_4$ - $SOCl_2$ system, and this does not result from discharge prior to storage.

What is claimed is:

1. A composition of matter including a compound having a metal cation and a clovoborate anion as an electrolyte salt and a material selected from the group consisting of fluid oxyhalides, fluid non-metallic oxides, fluid non-metallic halides and mixtures thereof.

2. The composition of matter of claim 1, wherein said metal is selected from the metals of the group Li, Na, K, Rb, Cs, Mg, Ca, Sr and Ba or combinations thereof.

3. The composition of matter of claim 1, wherein said metal is lithium.

4. The composition of matter of claim 1, wherein the clovoborate anion has a formula $(B_mX_n)^{-k}$ wherein $m$, $n$, and $k$ are integers with $m$ ranging from 6–20, $n$ ranging from 6–18 and $k$ ranging from 1-4, B is boron, and X is selected from the group consisting of H, F, Cl, Br, I, OH and combination thereof.

5. The composition of matter of claim 1, wherein said clovoborate anion is $B_{10}Cl_{10}^=$.

6. The composition of matter of claim 1, wherein said material is selected from the group of $SO_2$, $SO_3$, $VOCl_3$, $CrO_2Cl_2$, $SO_2Cl_2$, $NO_2Cl$, $NOCl$, $NO_2$, $SeOCl_2$, $POCl_3$, $SOCl_2$, $S_2Cl_2$, $S_2Br_2$.

7. The composition of matter of claim 6, wherein said oxyhalide is $SOCl_2$.

8. A composition of matter including $Li_2B_{10}Cl_{10}$ and $SOCl_2$.

9. An electrochemical cell including a metal anode, a cathode, and as electrolyte salt a salt including a metal cation and a clovoborate anion.

10. The electrochemical cell of claim 9, wherein said metal anode is comprised of metals selected from the group Li, Na, K, Rb, Cs, Mg, Ca, Sr and Ba or combinations thereof.

11. The electrochemical cell of claim 9, wherein said metal is Li.

12. The electrochemical cell of claim 9, wherein said cathode comprises a cathode depolarizer.

13. The electrochemical cell of claim 12, wherein said cathode depolarizer comprises a material selected from a fluid, oxyhalide or a fluid non-metallic oxide or a fluid non-metallic halide and mixtures thereof.

14. The electrochemical cell of claim 13, wherein said fluid oxyhalide or fluid non-metallic oxide or fluid non-metallic halide are selected from $SO_2$, $SO_3$, $VOCl_3$, $CrO_2Cl_2$, $SO_2Cl_2$, $NO_2CL$, $NOCl$, $NO_2$, $SeOCl_2$, $POCl_3$, $SOCl_2$, $S_2Cl_2$, and $S_2Br_2$.

15. The electrochemical cell of claim 14, wherein said cathode depolarizer is $SOCl_2$.

16. The electrochemical cell of claim 9, wherein the cation of a metal is a cation of a metal selected from the group Li, Na, K, Rb, Cs, Mg, Ca, Sr and Ba along or combinations thereof.

17. The electrochemical cell of claim 16, wherein said metal is Li.

18. The electrochemical cell of claim 9, wherein the clovoborate anion has a formula $(B_mX_n)^{-k}$ wherein $m$, $n$ and $k$ are integers with $m$ ranging from 6–20, $n$ ranging from 6–18 and $k$ ranging from 1–4, B is boron, and x is selected from the group consisting of H, F, Cl, Br, I, OH and combinations thereof.

19. The electrochemical cell of claim 18, wherein X is a halogen (F, Cl, Br, I) or mixtures thereof.

20. The electrochemical cell of claim 9, wherein the clovoborate anion is $B_{10}Cl_{10}^=$.

21. The electrochemical cell of claim 9, wherein said electrolyte salt is $Li_2B_{10}Cl_{10}$.

22. The electrochemical cell of claim 21, wherein said cathode is $SOCl_2$ and said cathode and said electrolyte salt are present in a ratio such that the conductivity of the resulting electrolyte solution at 20° C is in the range of $4 \times 10^{-9}$ ohm$^{-1}$ cm$^{-1}$ to $1.0 \times 10^{-1}$ ohm$^{-1}$ cm$^{-1}$.

23. A method for transporting ions between an anode and a cathode comprising the steps of dissolving in a fluid an electrolyte salt having a metal cation and clovoborate anion, and electrically conductively connecting said anode and cathode.

24. The method of claim 23, wherein said metal as Li.

25. The method of claim 23, wherein the clovoborate anion has a formula $(B_mX_n)^{-k}$ wherein $m$, $n$ and $k$ are integers, B is boron, and X is selected from the group consisting of H, F, Cl, Br, I, OH and combinations thereof.

26. The method of claim 24, wherein said clovoborate anion is $B_{10}Cl_{10}^=$.

* * * * *